(12) United States Patent
Quinn et al.

(10) Patent No.: US 7,466,888 B2
(45) Date of Patent: Dec. 16, 2008

(54) FILLER RIBBONS FOR RIBBON STACK

(75) Inventors: Justin Quinn, Newton, NC (US); Patrick King Strong, Connelly Springs, NC (US)

(73) Assignee: Draka Comteq BV, Amsterdam (NL)

( * ) Notice: Subject to any disclaimer, the term of this patent is extended or adjusted under 35 U.S.C. 154(b) by 0 days.

(21) Appl. No.: 11/531,066

(22) Filed: Sep. 12, 2006

(65) Prior Publication Data

US 2008/0063343 A1    Mar. 13, 2008

(51) Int. Cl.
*G02B 6/44*    (2006.01)

(52) U.S. Cl. .................. 385/114; 385/102; 385/105; 385/109

(58) Field of Classification Search ............... 385/114, 385/105, 102, 109
See application file for complete search history.

(56) References Cited

U.S. PATENT DOCUMENTS

| 5,621,842 | A | 4/1997 | Keller | |
|---|---|---|---|---|
| 6,519,399 | B2* | 2/2003 | Strong et al. | 385/114 |
| 6,749,446 | B2* | 6/2004 | Nechitailo | 439/114 |
| 6,909,829 | B2* | 6/2005 | Register et al. | 385/114 |

FOREIGN PATENT DOCUMENTS

GB    2215084 A    9/1999

* cited by examiner

*Primary Examiner*—Brian Healy
*Assistant Examiner*—Guy G Anderson
(74) *Attorney, Agent, or Firm*—Sughrue Mion, PLLC

(57) ABSTRACT

A buffer tube having therein a ribbon stack formed of optical fiber ribbons, and at least one filler ribbon provided on at least a top or bottom surface of the ribbon stack. The filler ribbon is provided to increase coupling between the ribbon stack and the buffer tube and to reduce fiber attenuation.

14 Claims, 2 Drawing Sheets

FILLER RIBBONS FOR RIBBON STACK

BACKGROUND OF THE INVENTION

The present invention generally relates to a filler ribbon for placement on top and/or bottom portions of a ribbon stack in a buffer tube.

In related buffer tubes, grease is provided in the tubes to reduce fiber attenuation of the optical fibers in a ribbon stack. The grease helps reduce water penetration, and adds cushion between the ribbon fibers and the buffer tube. When using grease, however, a clearance must also be provided between the top and bottom ribbon and the buffer tube, to reduce contact between the fibers and the buffer tube. Other materials used in related buffer tubes include foam layers, water blocking tape, gel and yarns.

SUMMARY OF THE INVENTION

In view of the foregoing, aspects of the present invention are provided to help further reduce fiber attenuation, while at the same time increase coupling between the ribbon stack and the buffer tube, and reduce the necessary size of the buffer tube. In an illustrative, non-limiting embodiment, a buffer tube is provided. Enclosed in the buffer tube is a ribbon stack formed of at least one layer of optical fiber ribbons, and at least one filler ribbon provided on at least a top or bottom surface of the ribbon stack. The filler ribbon is provided to preferably contact the top and/or bottom surface of the ribbon stack. Further, the filler ribbon is preferably formed to be similar in size and shape as the optical fiber ribbons, however, the filler ribbon does not necessarily have to contain any optical fibers therein.

BRIEF DESCRIPTION OF THE DRAWINGS

Aspects of illustrative, non-limiting embodiments of the present invention will become more apparent by describing in detail embodiments thereof with reference to the attached drawings in which.

DETAILED DESCRIPTION OF THE INVENTION

The following description of illustrative, non-limiting embodiments of the invention discloses specific configurations and components. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations and components of the present invention that are known to one skilled in the art are omitted for the sake of clarity and brevity.

Figure 1:
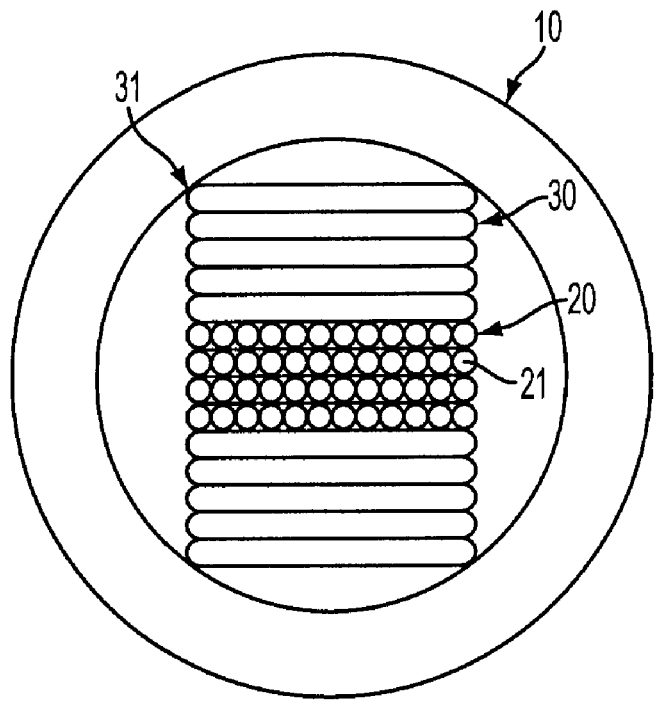
FIG. 1 shows a cross-section of a buffer tube with an optical fiber ribbon stack and filler ribbons therein.

FIG. 1 shows an optical fiber encapsulating system according to an illustrative, non-limiting embodiment of the present invention. As shown, a buffer tube 10 is provided with a plurality of optical fiber ribbons 20 to form a ribbon stack, and filler ribbons 30 stacked together on the top and bottom surfaces of the ribbon stack. It is preferable that the corner portions 31 of the uppermost filler ribbon 30 and lowermost filler ribbon 30 contact the inner surface of the buffer tube. Each optical fiber ribbon 20 comprises a plurality of optical fibers 21 disposed side by side and covered with a coating material. As shown in FIGS. 1-4, there are twelve optical fibers 21 provided in each optical fiber ribbon 20. However, such number is merely exemplary. Each optical fiber ribbon 20 can contain any desired number of optical fibers. Example coating materials of the optical fiber ribbons 20 include Mylar® and UV curable resin, however, any other conventional coating material can be used. The optical fiber ribbons 20 and the filler ribbons 30 are merely stacked on top of each other. In a gel or grease filled buffer tube, the gel or grease helps to hold the ribbon stack together. In a dry or gel-free buffer tube, a foam bead, yarn or tape can be placed around the ribbon stack to hold the ribbon stack together. Any other conventional method can be used to hold the stack together if needed.

The filler ribbons 30 can be formed of the same material as the coating material of the optical fiber ribbons 20. Since the filler ribbons 30 are used as a type of space filler for the optical fiber ribbons 20, it is beneficial for the filler ribbons 30 to behave similar to or have similar characteristics as the optical fiber ribbons 20, such as stiffness, hardness, friction, etc. On the other hand, the filler ribbons 30 can be formed of other materials such as foam, plastic, silicone, rubber, coatings containing glass, etc.

Figure 2:
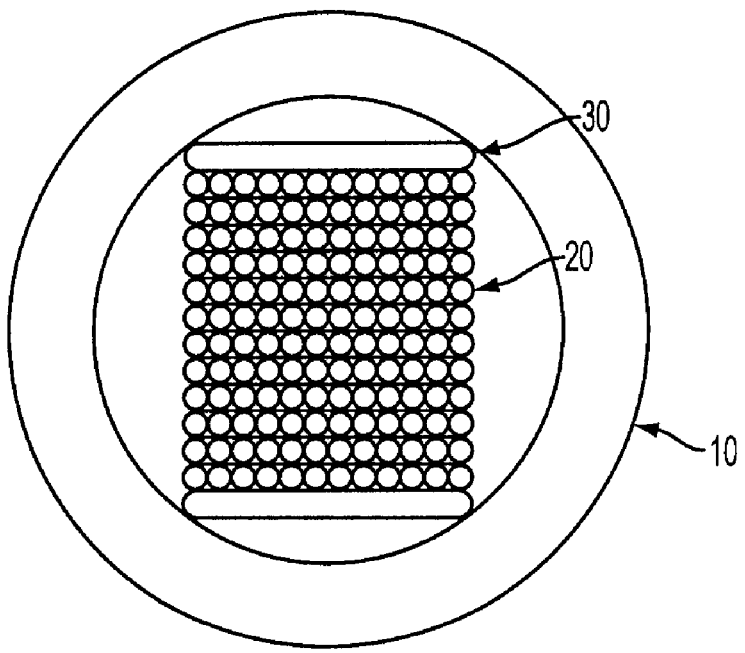
FIG. 2 shows a cross-section of a buffer tube with an optical fiber ribbon stack and two filler ribbons therein.
Figure 3:
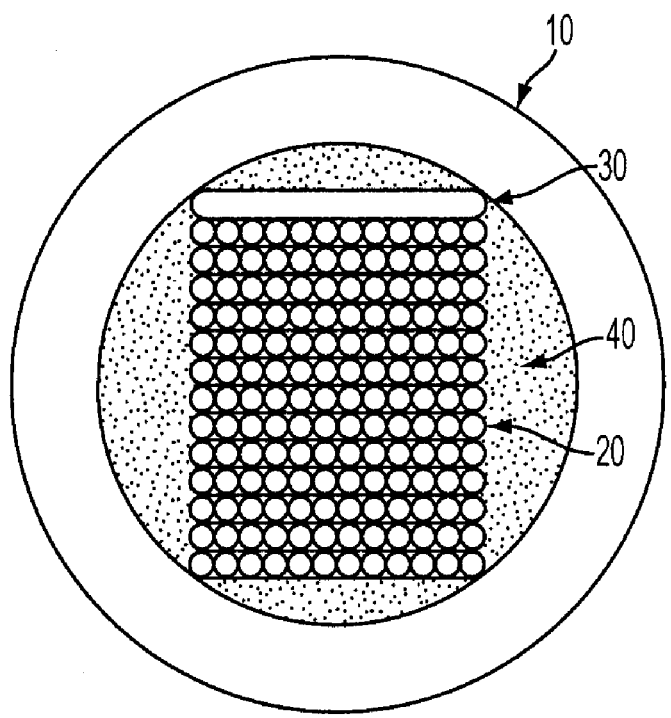
FIG. 3 shows a cross-section of a buffer tube with an optical fiber ribbon stack, one filler ribbon therein and a grease material surrounding the filler ribbon and optical ribbon stack.
Figure 4:
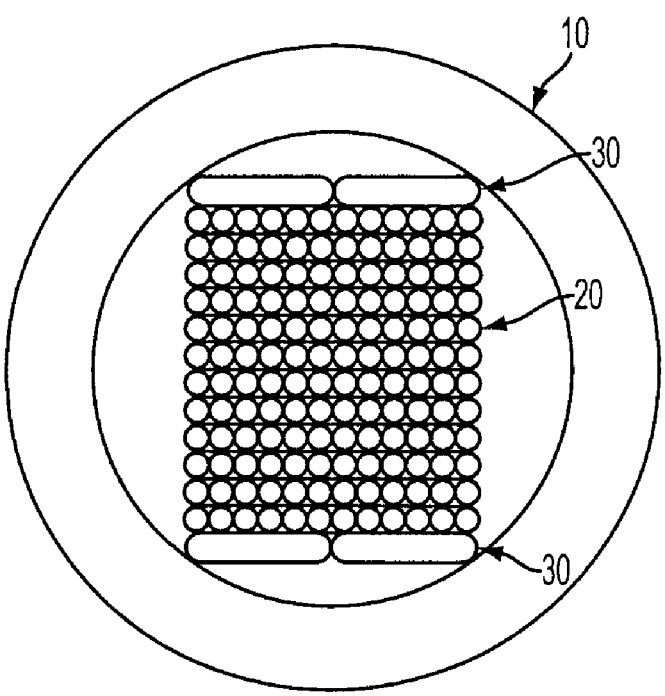
FIG. 4 shows a cross-section of a buffer tube with an optical fiber ribbon stack and strips of filler ribbons therein.

As shown in FIG. 1, each filler ribbon 30 is formed to be equal or at least substantially equal in height, width and length as a respective optical fiber ribbon 20. FIG. 1, along with FIGS. 2-4, are cross-sectional views of the buffer tube 10 when viewing the buffer tube 10 in an axial direction. Therefore, the height and width, as discussed throughout this Application, are in regard to the cross-sectional views as shown.

In alternate embodiments, the filler ribbon 30 can be formed to be either larger or smaller in length, width and height than the optical fiber ribbons 20. Further, rather than a plurality of thin filler ribbons 30 as shown in FIG. 1, a single filler block or spacer can be used to fill the same area as the plurality of filler ribbons 30 combined.

The filler ribbons 30 are provided to increase coupling between the ribbon stack of optical fiber ribbons 20 and the buffer tube 10. Efficient coupling is needed to reduce or prevent ribbon retraction in splice enclosures and to maintain excess ribbon length. Therefore, it is important that the optical fiber ribbons 20 move with the buffer tube 10, rather than consistently move independent of the buffer tube 10. The increased coupling or friction provided by the filler ribbons 30 enables such combined movement. In addition, since the filler ribbons 30 provide a type of barrier between the buffer tube 10 and the optical fiber ribbons 20, the filler ribbons 30 help reduce fiber attenuation that may occur due to contact between fibers of a ribbon stack and a buffer tube.

In the non-limiting embodiment of FIG. 1, the stack of optical fiber ribbons 20 is small compared to the available space inside the buffer tube 10. Thus, in this situation, a plurality of filler ribbons 30 consume the remaining space to ensure frictional resistance between the overall stack (ribbons 20 and fillers 30 combined) and the buffer tube 10. In an alternate, non-limiting embodiment, as shown in FIG. 2, only two filler ribbons 30 are provided since the stack of optical fiber ribbons 20 consumes most of the space inside the buffer tube 10. Since each of the filler ribbons 30 are formed to be a similar size and shape as each respective optical fiber ribbon 20, the filler ribbons 30 act as space fillers, such that a varying amount of filler ribbons 30 can be provided in each buffer tube 10, as needed, to produce a consistent stack size regardless of the optical fiber ribbon count. Accordingly, one size buffer tube 10 can be used to accommodate ribbon stacks of various sizes. For smaller size ribbon stacks, a greater number of filler ribbons 30 can be provided, and for larger size ribbon stacks, fewer filler ribbons 30 can be provided. The ability to create one size buffer tube 10 to accommodate such a variety of ribbon stack sizes will help reduce manufacturing costs and production time.

In the non-limiting embodiment of FIG. 3, a single filler ribbon 30 is provided on only one side of the stack of optical fiber ribbons 20. Although such embodiment is within the scope of the invention, it is preferable to have at least one filler ribbon 30 on the top and bottom of the stack of optical fiber ribbons 20. Also as shown in the non-limiting embodiment of FIG. 3, a grease material 40 is provided to flood or fill the interior of the buffer tube 10, so as to surround the filler ribbon 30 and the optical fiber ribbons 20. Such grease material 40 is commonly used in the art and therefore, the exact composition is not disclosed in detail herein. The grease material 40 helps reduce water penetration, and adds cushion between the ribbon stack and the buffer tube 10. When using the grease material 40 in combination with the filler ribbons 30, it may not be necessary to provide a clearance between the ribbon stack and the buffer tube 10, as in the conventional method where only grease is used, since the filler ribbons 30 prohibit the ribbon stack from contacting the buffer tube 10. However, in an alternate embodiment, a clearance can additionally be provided. Any other type of material that aids in water penetration may be used in lieu of or in addition to the grease material 40, such as gel, water-blocking tape, foam, water swellable yarns, etc.

Finally, as shown in the non-limiting embodiment of FIG. 4, the filler ribbons 30 can be formed as thin strips, which are each narrower in width than the respective optical fiber ribbons 20. As shown in the cross-sectional view of FIG. 4, four such filler ribbons 30 are provided at upper and lower edges of the ribbon stack.

The previous description of the non-limiting embodiments is provided to enable one skilled in the art to make and use the present invention. Moreover, various modifications to these embodiments will be readily apparent to those skilled in the art, and the generic principles and specific examples defined herein may be applied to other embodiments without the use of inventive faculty. For example, although the filler ribbons are provided in combination with optical fiber ribbons, any other type of ribbon containing fibers or wires therein may be used. Therefore, the present invention is not intended to be limited to the embodiments described herein, but is to be accorded the widest possible scope as defined by the recitations of the claims and equivalents thereof.

What is claimed is:

1. An optical fiber encapsulating system comprising:
a buffer tube;
a ribbon stack provided in the buffer tube, the ribbon stack formed of a plurality of optical fiber ribbons; and
a plurality of filler ribbons provided on at least a top or bottom surface of the ribbon stack, so as to contact the top or bottom surface of the ribbon stack,
wherein the plurality of filler ribbons are not provided on side surfaces of the ribbon stack,
wherein at least one of the plurality of filler ribbons contacts an inner surface of the buffer tube, so as to increase coupling between the ribbon stack and the buffer tube, and
wherein the plurality of filler ribbons are equal in height, width and length to the plurality of optical fiber ribbons.

2. The optical fiber encapsulating system according to claim 1, wherein a plurality of optical fiber ribbons are provided in the ribbon stack.

3. The optical fiber encapsulating system according to claim 1, wherein the plurality of filler ribbons are provided on the ribbon stack such that at least one filler ribbon is provided on the top surface of the ribbon stack and at least one filler ribbon is provided on the bottom surface of the ribbon stack.

4. The optical fiber encapsulating system according to claim 1, wherein each optical fiber ribbon comprises a plurality of optical fibers disposed side by side and covered with a coating material.

5. The optical fiber encapsulating system according to claim 1, further comprising a grease material that fills an interior of the buffer tube, so as to surround the ribbon stack and the plurality of filler ribbons.

6. The optical fiber encapsulating system according to claim 5, wherein a portion of the plurality of filler ribbons contact the grease material.

7. The optical fiber encapsulating system according to claim 1, wherein the plurality of filler ribbons are stacked together to form a filler ribbon stack.

8. The optical fiber encapsulating system according to claim 1, wherein at least one respective filler ribbon is provided at each upper and lower edge of one of the plurality of optical fiber ribbons in the axial direction.

9. The optical fiber encapsulating system according to claim 1, wherein at least one of foam, water-blocking tape, gel and yarn fills an interior of the buffer tube, so as to surround the ribbon stack and the plurality of filler ribbons.

10. The optical fiber encapsulating system according to claim 1, wherein a portion of the plurality of filler ribbons contact the at least one of foam, water-blocking tape, gel and yarn provided in the buffer tube.

11. The optical fiber encapsulating system according to claim 1, wherein the plurality of filler ribbons comprise a single filler block or spacer.

12. The optical fiber encapsulating system according to claim 1, wherein the plurality of filler ribbons do not contain any optical fibers therein.

13. The optical fiber encapsulating system according to claim 1, wherein the plurality of filler ribbons and the plurality of optical fiber ribbons are formed of the same material.

14. The optical fiber encapsulating system according to claim 1, wherein the at least one of the plurality of filler ribbons contacts the inner surface of the buffer tube continuously.

* * * * *